Patented June 17, 1952

2,600,623

UNITED STATES PATENT OFFICE 2,600,623

MODIFIED ALKYD RESIN REACTED WITH STYRENE AND AN ACRYLONITRILE

John H. Daniel, Jr., Stamford, and John C. Petropoulos, South Norwalk, Conn., assignors to American Cyanamid Company, New York, N. Y., a corporation of Maine No Drawing. Application September 8, 1949, Serial No. 114,676

11 Claims. (Cl. 260—22)

This invention relates to compositions of matter comprising the reaction product of a modified alkyd resin with monomeric acrylonitrile and monomeric styrene. More particularly, this invention relates to compositions of matter comprising modified alkyd resins in which the alkyd resin is modified by the addition of an $\alpha,\beta$-unsaturated monocarboxylic acid having the general formula R—CH=CHCOOH wherein R is (1) an alkyl radical having between 1 and 3 carbon atoms, (2) a furyl radical, and (3) a phenyl radical. This invention further relates to modified alkyd resins which have been modified by the addition of a monocarboxylic acid of the group consisting of the acids of natural-drying oils and semi-drying oils. This invention further relates to the processes of preparing these compositions of matter comprising modified alkyd resins, coreacted with monomeric acrylonitrile and monomeric styrene.

The object of this invention is to prepare a composition of matter comprising an oil modified alkyd resin, coreacted with acrylonitrile and styrene which are particularly adaptable for use in surface-coating materials. A further object of the invention is to prepare surface-coating materails which are particularly resistant to solvent disintegration. A further object of the invention is to prepare these oil modified alkyd resins in a mutually inert solvent, i. e. a solvent which is essentially inert to all of the reactive components of the reaction and subsequently evaporating the solvent so as to leave the resin per se. A still further object of this invention is to prepare these oil modified alkyd resins without the use of the mutually inert solvent. Other objects of the instant invention will be set forth further in detail hereinbelow.

The surface coating materials prepared according to the processes of the instant invention display unusual solvent resistance, hardness and mar resistance over and beyond that which the prior art surface-coating materials have displayed. These surface-coating materials are additionally rapid air-drying compositions and are particularly utilizable in varnishes, paints, enamels and lacquers. In order that the invention may be more completely understood, the following detailed examples are set forth for the purposes of illustration only and are not to be considered as limitations from the case except as indicated by the appended claims. In these examples, all parts are parts by weight.

EXAMPLE 1

148 parts of phthalic acid anhydride, 100 parts of crotonic acid, 400 parts of soya fatty acids and 178 parts of pentaerythritol are introduced into a suitable reaction vessel and 40 parts of xylol is added as a solvent. The mixture is then heated gradually to about 240° C., whereupon heating is then continued until the reaction mixture has an acid number of about 8–9. The viscosity of a 60% solid solution of the resin thus prepared in Varsol No. 1 is I on the Gardner-Holdt scale.

360 parts of the oil modified alkyd prepared above is diluted with 600 parts of xylol and the mixture is heated to reflux in a suitable reaction vessel equipped with thermometer, stirrer and condenser. To this hot solution at reflux is slowly added over a 4 hour period a mixture of 180 parts of styrene, 60 parts of monomeric acrylonitrile and 6 parts ditertiary butyl peroxide catalyst. After the addition has been completed the heating is continued for about 6 hours at which time a 50% solids solution in xylol has a viscosity of X on the Gardner-Holdt scale. A film of the above resin is prepared by forming a 5 mil coating on glass. The film thus prepared dries very rapidly and exhibits an excellent "through-dry." The air-dried films are baked for 30 minutes at 300° F. and are then treated with a small piece of absorbent paper saturated with Varsol No. 1, the film thus treated shows no failure after 24 hours of exposure. This fact demonstrates the improved solvent resistance of the films prepared by use of the coating composition of the present invention.

The following examples are introduced for the purpose of showing the improved results obtained when the mixture of the monomers, acrylonitrile and styrene are used in contrast with the coating materials prepared when monomeric styrene alone is used to modify the oil modified alkyd resin.

EXAMPLE 2

148 parts of phthalic acid anhydride, 100 parts of crotonic acid, and 400 parts of soya fatty acids, 178 parts of pentaerythritol are introduced into a suitable reaction vessel with about 40 parts of xylol as the solvent, and the mixture is heated to about 240° C. until an acid number of 8–10 is attained.

360 parts of the above-prepared alkyd resin is diluted with 400 parts of xylol and the mixture is heated to reflux in a suitable reaction chamber equipped with thermometer, stirrer and condenser. To the hot solution there is slowly added over a 4-hour period 240 parts of styrene and 6 parts ditertiary butyl peroxide catalyst. After the addition has been completed the heating is continued for a period of about 6 hours. A film from this resin solution is prepared containing 0.01% of a cobalt drier by forming a 5 mil coating on glass. The film is air-dried and then baked for 30 minutes at 300° F. The coating is then treated in the same manner as the coating of Example 2, by treating the film with a small piece of absorbent paper saturated with Varsol No. 1. The coating from this sample softened within 45 minutes as contrasted with a coating made from the resin of Example 1 which showed no failure after 24 hours of exposure to the Varsol No. 1. It is only after 30 hours of exposure to Varsol No. 1 that the film prepared from the resin of Example 1 reached a condition comparable to that condition which the coating of Example 2 had reached after 45 minutes exposure.

EXAMPLE 3

148 parts of phthalic acid anhydride, 25 parts of cinnamic acid, 400 parts of soya acid and 133 parts of pentaerythritol and 40 parts of xylol as the mutual inert solvent are introduced into a suitable reaction chamber equipped with a moisture trap containing xylol. The mixture is heated gradually to about 240° C. and the heating is continued until the product has an acid number of about 9. The viscosity of this oil modified alkyd resin containing 60% solids in Varsol No. 2 is about M on the Gardner-Holdt scale. Varsol No. 2 is a moderately high-boiling aliphatic hydrocarbon fraction of comparatively low Kauri-butanol value.

90 parts of the alkyd prepared according to the process set forth above is dissolved in 225 parts of xylol and the solution is heated to reflux in a suitable reaction vessel equipped with a stirrer, thermometer and condenser. To the refluxing solution is added gradually a mixture of 45 parts of monomeric styrene and 15 parts of monomeric acrylonitrile. Incorporated in the monomeric mixture is 1.5 parts of ditertiary butyl peroxide catalyst. The addition of the mixture is completed in about a 4 hour period. Refluxing is continued for 1 hour after this final addition has been made. An additional 100 parts of xylol is then added to the product. The films prepared by use of this resin solution air dry very rapidly and the baked films in which a small amount of cobalt drier has been added are hard and clear and fail the Varsol test after one and one-half hours. The Varsol test consists of treating a baked enamel film with a small piece of absorbent paper saturated with the Varsol No. 1 which is a moderately high-boiling aliphatic hydrocarbon fraction of low Kauri-butanol value. The coating is observed until failure under the solvent is observed.

EXAMPLE 4

120 parts of the alkyd resin described in the first part of Example 1 is diluted with 133 parts of xylol and the mixture is heated to reflux. A mixture of 60 parts of styrene and 20 parts of methacrylonitrile and 2 parts of ditertiary butyl peroxide is added slowly over a 4 hour period and the refluxing is then continued for an additional 6 hours. The viscosity of a 60% solids solution in xylol is T on the Gardner-Holdt scale. Clear baked coatings are prepared in the manner described hereinabove in Example 1, and the sample is then subjected to the solvent resistance test by use of Varsol No. 1 and failure of the film is observed after a 5 hour period. It is to be remembered that the films prepared by use of the resin solution of Example 2 failed in 45 minutes.

EXAMPLE 5

A modified alkyd resin is prepared exactly in the same manner as that set forth in Example 4, except that in the place of the 20 parts of methacrylonitrile there is used 20 parts of α-ethyl acrylonitrile. This resin solution has a viscosity of F on the Gardner-Holdt scale in a 60% solids solution in xylol.

EXAMPLE 6

An alkyd resin is prepared by reacting together 148 parts of phthalic acid anhydride, 106 parts of crotonic acid, 424 parts of the fatty acid fraction of talloil, and 183 parts of pentaerythritol. About 40 parts of xylol is used as the solvent in the preparation of this alkyd resin. The finished resin has an acid number of 10 to 11 and the viscosity of a 60% solids solution of the resin in Varsol No. 1 is within the range of T-U on the Gardner-Holdt scale.

360 parts of the alkyd prepared according to the process set forth hereinabove is diluted with 576 parts of xylol and the mixture is heated to reflux in a suitable reaction chamber while stirring. A mixture of 198 parts of styrene, 66 parts of acrylonitrile and 12 parts of cumene hydroperoxide catalyst is added gradually over a one hour period. An additional 6 hours of refluxing is carried out after the completion of the addition of the monomers (viscosity Y on the Gardner-Holdt scale—60% solids solution in xylol). Enamels formulated with this resin displayed superior drying and solvent resistance properties.

In the preparation of the oil modified alkyd resin prior to the copolymerization with the monomeric acrylonitrile and the monomeric styrene the use of the α,β-unsaturated acids are necessary in order to form these alkyd resins of the instant invention. These α,β-unsaturated acids may be best described by saying that they must have the following general formula, R—CH=CHCOOH wherein R is (1) an alkyl chain of between 1 and 3 carbon atoms, (2) a phenyl radical, and (3) a furyl radical. More specifically, these acids would be crotonic, β ethyl acrylic acid and β propyl acrylic acid, cinnamic acid or furylacrylic acid.

In the preparation of the oil modified alkyd resin prior to the treatment of the resin with the monomers, one may use in the place of phthalic acid the saturated aliphatic polycarboxylic acids such as succinic, glutaric, sebacic, adipic, pimelic, suberic, azelaic, or tricarballylic. The use of the expression, saturated aliphatic polycarboxylic acid, not only includes the dicarboxylic acids but also includes the anhydrides of these polycarboxylic acids. In the preparation of the resin, it is possible to use these acids either singly or in combination with one another.

Amongst the different polyhydric alcohols that may be used in the practice of the process of this invention are such alcohols as diethylene glycol, ethylene glycol, trimethylene glycol, tetramethylene glycol, pentamethylene glycol, pinacol, arabitol, xylitol, adonitol, mannitol, dulcitol, sorbitol, glycerol, and pentaerythritol. These polyhydric alcohols may be used singly or in combination with one another in the preparation of the resin per se.

In the preparation of the oil modified alkyd resin prior to the copolymerization with the acrylonitrile and the styrene monomers, the viscosity requirement is not particularly critical although it is preferred to permit the reaction to proceed until the viscosity of a 60% solid solution of the resin in Varsol No. 1 is within the range of A–Z on the Gardner-Holdt scale. It is further preferred in the coreaction of these starting materials that the reaction be permitted to continue until the acid number of the reaction mix is less than 30. In the final reaction in which the oil modified alkyd is further modified by the copolymerization with the combination of monomers, the reaction should be permitted to proceed until the viscosity of the finished resin in 50%–60% solid resin in xylol is within the range of F–$Z_5$ on the Gardner-Holdt scale with the range of L–$Z_2$ preferred. The monomer conversion in this final coreaction is over 80%.

The esterification reaction which takes place during the formation of modified alkyd resin and the subsequent final copolymerization with the monomeric acrylonitrile and the monomeric styrene may be carried out in the presence of a mutually inert solvent, preferably one which has a Kauri-butanol value between the limits of 75 to 105 such as xylol, toluol, high flash naphtha, Solvesso 100, Solvesso 150, heavy aromatic naphtha and the like. The initial alkyd resin may be prepared in solvents of even lower Kauri-butanol value such as Varsol #1 and Varsol #2. Actually it is not imperative that a solvent be used in either of these reactions, but because of necessity of a much stricter control of conditions, it is much to be preferred in these reactions that a solvent be used. Given in more detail in the following table, the characteristics of the solvents are:

results as desirable as those shown when the combination is used. The higher the proportion of acrylonitrile to styrene the greater the solvent resistance of the finished film. It must be remembered, however, that if the ratio of the acrylonitrile to styrene is too high, the compatibility of the resin and solvent is lowered. In the preparation of the oil modified alkyd, it is preferred that the usual limits for the preparation of an alkyd be utilized, namely, that about 20 to 50% of the total alkyd resin weight be saturated polycarboxylic acid, and that the acids derived from the drying and semi-drying oils be present in an amount varying between 45–70% of the total weight of the oil modified alkyd. It is important, however, that in the modification of the alkyd resin that no less than 2% and no more than 30% of the $\alpha,\beta$-unsaturated monocarboxylic acid such as crotonic acid be used and it is actually preferred that this amount be limited to 5% to 15% by weight based on the total weight of the alkyd resin produced. The amount of the polyhydric alcohol to be used in the preparation oil modified alkyd resin will be in variable quantities but calculable. It will depend on the particular polycarboxylic acid selected, the particular $\alpha,\beta$-unsaturated monocarboxylic acid selected and the acids of the particular oil and their respective amounts. It is necessary, however, to have a sufficient amount of the polyhydric alcohol present in order that the completed reaction will give a product having an acid number less than 30. Consequently, from this can be seen that on a stoichiometrical basis the actual

*Characteristics of hydrocarbon solvents*

[Distillation Range ° F.]

| Solvent | Manufacturer | Specific Gravity | In. Boiling Pt. | Temperature at 50% | Temperature at 90% | Final Boiling Pt. | Kauri-Butanol Value Toluene=100 | Aniline Pt. ° F. |
|---|---|---|---|---|---|---|---|---|
| Xylol | Standard Oil of New Jersey. | | 276 | 284 | 288 | 292 | 93 | [1] 51 |
| Solvesso No. 100 | do | .875 | 306 | 317 | 327 | 343 | 90 | [1] 54 |
| Sovasol No. 75 | Socony Vacuum Oil Company. | .872 | 325 | 348 | 369 | 386 | 77 | [1] 82 |
| Solvesso No. 150 | | .892 | 375 | 387 | 392 | 410 | 83 | 68 |
| Toluol | | .869 | 227 | 231 | 232 | 233 | 100 | 50 |
| Hi-Flash Naphtha | | .868 | 320 | 333 | 345 | 365 | 90 | |
| Heavy Aromatic Naphtha | | .924 | 313 | 404 | 482 | 526 | 85 | 77 |

[1] Mixed aniline point ° F.

As illustrative examples of the monocarboxylic acids which may be used in the preparation of the modified alkyd resin in accordance with the practice of the process of this invention are the acids of soya oil, linseed oil, dehydated castor oil, perilla oil, safflower oil, tung oil, oiticica oil and the like but it is preferred to use the non conjugated type of drying and semi-drying oils, alone or in predominant amounts.

In the polymerization of the oil modified alkyd with the monomeric acrylonitrile and monomeric styrene it is preferred that the total weight of the monomers based on the total weight of monomers and alkyd resins be within the range of 25% and 60% with the 30–50% range preferred. The ratio of the monomeric styrene to the monomeric acrylonitrile is between 9:1 and 1:1 with the preferred limits 6:1 to 2:1, respectively. The applicants have discovered that the use of acrylonitrile with the styrene is necessary in at least the minimum ratio set forth hereinabove and it has been shown in Example 3 hereinabove that the preparation of the modified alkyd resin without the use of acrylonitrile does not produce amount of a particular polyhydric alcohol can be computed.

In the preparation of these oil modified alkyd resins the first reaction can be completed without the use of a catalytic agent although in actual practice the use of such an agent will serve to increase the speed of reaction. In the second phase of the reaction, that in which the oil modified alkyd is copolymerized with the monomers, it is preferred that a catalytic agent be present. Several catalytic agents have been mentioned hereinabove in the specific examples enumerated. Other catalytic agents which may be used are benzoyl peroxide, lauroyl peroxide, methyl ethyl ketone, the tertiary alkyl substituted hydroperoxides and diperoxides such as 2,2 bis(tertiary alkyl peroxy)butane, ditertiary butyl peroxide, tertiary butyl hydroperoxide and the like. These catalytic agents may be used separately or in combination with one another. It is only necessary that small amounts of these catalytic agents be present, such as from .05% to 5%, said percentages being by weight, based on the total weight of the reactants. When these resins are to be used in surface-coating material, it is generally preferred to incorporate in the resin solution a small amount of drier such as cobalt naphthenate, lead naphthenate, and the like.

In the course of the example set forth hereinabove, it is to be noted that the preparation of these resins have not been limited to the use of monomeric acrylonitrile and monomeric styrene alone, and it has been shown that other substituted acrylonitriles and substituted styrenes are utilizable. The results obtained when these substituted monomers are used are not quite as good as the results attained when the unsubstituted acrylonitrile and unsubstituted styrene are used. However, it is to be noted that notwithstanding the fact that optimum results are achieved when the unsubstituted monomers are used, it is within the scope of this invention to use the substituted monomers as well.

We claim:

1. A composition of matter comprising the reaction product, produced by heating in the presence of a catalyst and a solvent, a compound selected from the group consisting of monomeric acrylonitrile, monomeric methacrylonitrile, and monomeric ethacrylonitrile and monomeric styrene with a modified alkyd resin prepared by reacting a polycarboxylic acid, consisting essentially of an acid selected from the group consisting of phthalic acid and the saturated aliphatic polycarboxylic acids, a saturated polyhydric alcohol, a monocarboxylic acid selected from the group consisting of the acids of natural-drying oils and semi-drying oils, and an $\alpha,\beta$-unsaturated monocarboxylic acid having the general formula R—CH=CHCOOH, wherein R is a member selected from the group consisting of (1) an alkyl radical having one to three carbon atoms, (2) a furyl radical, (3) a phenyl radical; in which the combined weight of the monomers varies between 25% and 60% of the total combined weight of alkyd and monomers, and in which the weight ratio of monomeric styrene to monomeric acrylonitrile is within the range of 9:1 and 1:1, the $\alpha,\beta$-unsaturated acid being present in an amount varying between 2% and 30% of the total weight of the alkyd.

2. A composition of matter comprising the reaction product, produced by heating in the presence of a catalyst and a solvent, of monomeric acrylonitrile and monomeric styrene with a modified alkyd resin prepared by reacting a polycarboxylic acid consisting essentially of an acid selected from the group consisting of phthalic acid and the saturated aliphatic polycarboxylic acids, a saturated polyhydric alcohol, a monocarboxylic acid selected from the group consisting of the acids of natural-drying oils and semi-drying oils, and an $\alpha,\beta$-unsaturated monocarboxylic acid having the general formula

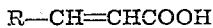

R—CH=CHCOOH wherein R is a member selected from the group consisting of (1) an alkyl radical having one to three carbon atoms, (2) a furyl radical, (3) a phenyl radical; in which the combined weight of the monomers varies between 30-50% of the total combined weight of alkyd and monomers, and in which the weight ratio of the monomeric styrene to the monomeric acrylonitrile is within the range of 6:1 and 2:1 and the $\alpha,\beta$-unsaturated acid is present in an amount varying between 3% and 15% of the total weight of the alkyd.

3. A surface-coating composition comprising the reaction product, produced by heating in the presence of a catalyst and a solvent, of monomeric acrylonitrile and monomeric styrene with a modified alkyd resin prepared by reacting a polycarboxylic acid component consisting essentially of phthalic anhydride, pentaerythritol, crotonic acid, and the monocarboxylic acid of soya oil; in which the combined weight of the monomers varies between 30-50% of the total combined weight of alkyd and monomers and in which the weight ratio of the monomeric styrene to monomeric acrylonitrile is within the range of 6:1 to 2:1, and the crotonic acid is present in an amount varying between 3% and 15% of the total weight of the alkyd resin, and a solvent.

4. A surface-coating composition comprising the reaction product, produced by heating in the presence of a catalyst and a solvent, of monomeric acrylonitrile and monomeric styrene with a modified alkyd resin prepared by reacting (1) a polycarboxylic acid consisting essentially of adipic acid, (2) diethylene glycol, (3) furyl acrylic acid, and the monocarboxylic acid of dehydrated castor oil; in which the combined weight of the monomers varies between 30-50% of the total combined weight of the alkyd resin and the monomers and in which the weight ratio of the monomeric styrene to monomeric acrylonitrile is within the range of 6:1 to 2:1, and the furyl acrylic acid is present in an amount varying between 3% and 15% of the total weight of the alkyd resin, and a solvent.

5. A surface-coating composition comprising the reaction product, produced by heating in the presence of a catalyst and a solvent, of monomeric acrylonitrile and monomeric styrene with a modified alkyd resin prepared by reacting (1) a polycarboxylic acid consisting essentially of succinic acid, (2) glycerol, (3) cinnamic acid, (4) the monocarboxylic acid of linseed oil; in which the combined weight of the monomers varies between 30-50% of the total combined weight of the alkyd resin and of monomers and in which the weight ratio of monomeric styrene to monomeric acrylonitrile is within the range of 6:1 to 2:1, respectively, and the cinnamic acid is present in an amount varying between 3% and 15% of the total weight of the alkyd resin, and a solvent.

6. A process for preparing modified alkyd resins which comprises heating a polycarboxylic acid component consisting essentially of phthalic anhydride, pentaerythritol, crotonic acid, and the monocarboxylic acid of soya oil in the presence of a catalyst and a mutually inert solvent until an acid number of less than 30 is reached, adding monomeric acrylonitrile and monomeric styrene thereto and reacting the mixture until a 50%-60% solids solution of the modified alkyd resin in xylol has a viscosity of F-$Z_5$ on the Gardner-Holdt scale, wherein the combined weight of the monomers varies between 25% and 60% of the total combined weight of alkyd and monomers; wherein the weight ratio of monomeric styrene to monomeric acrylonitrile is within the range of 9:1 and 1:1 and wherein the $\alpha,\beta$-unsaturated monocarboxylic acid is present in an amount varying between 2% and 30% of the total weight of the alkyd resin.

7. A process for preparing modified alkyd resins which comprises heating polycarboxylic acid consisting essentially of adipic acid, diethylene glycol, furyl acrylic acid, and the monocarboxylic acid of dehydrated castor oil in the presence of a catalyst and a mutually inert solvent until an acid number of less than 30 is reached, thereafter adding monomeric acrylonitrile and monomeric styrene thereto and reacting the mixture until a 60% solids solution of the modified alkyd resin in xylol has a viscosity of L–$Z_2$ on the Gardner-Holdt scale, wherein the combined weight of the monomers varies between 25% and 60% of the total combined weight of alkyd and monomers; wherein the weight ratio of monomeric styrene to monomeric acrylonitrile is within the range of 9:1 and 1:1 and wherein the $\alpha,\beta$-unsaturated monocarboxylic acid is present in an amount varying between 2% and 30% of the total weight of the alkyd resin.

8. A process for preparing modified alkyd resins which comprises heating (1) a polycarboxylic acid consisting essentially of succinic acid, (2) glycerol, (3) cinnamic acid, (4) a monocarboxylic acid of linseed oil in the presence of a catalyst and mutually inert solvent until an acid number of less than 30 is reached, thereafter adding thereto monomeric acrylonitrile and monomeric styrene and reacting the mixture until a 50%–60% solids solution of the modified alkyd resin in xylol has a viscosity of L–$Z_2$ on the Gardner-Holdt scale, wherein the combined weight of the monomers varies between 25% and 60% of the total combined weight of alkyd and monomers; wherein the weight ratio of monomeric styrene to monomeric acrylonitrile is within the range of 9:1 and 1:1 and wherein the $\alpha,\beta$-unsaturated monocarboxylic acid is present in an amount varying between 2% and 30% of the total weight of the alkyd resin.

9. A process for preparing a composition of matter which comprises heating (1) a polycarboxylic acid consisting essentially of a polycarboxylic acid selected from the group consisting of phthalic acid and the saturated aliphatic polycarboxylic acids, (2) a polyhydric alcohol, (3) a monocarboxylic acid selected from the group consisting of the acids of natural drying oils and semi-drying oils and (4) an $\alpha,\beta$-unsaturated monocarboxylic acid having the general formula R—CH=CHCOOH wherein R is a member of the group consisting of an alkyl radical having 1–3 carbon atoms, a furyl radical and a phenyl radical, until an acid number of less than 30 is reached, adding thereto a mixture of monomeric styrene and a compound selected from the group consisting of monomeric acrylonitrile, monomeric methacrylonitrile and monomeric ethacrylonitrile and heat reacting the mixture in the presence of a catalyst and a mutually inert solvent, until a 60% solids solution of the modified resin, in a hydrocarbon solvent, has a viscosity of F–$Z_5$ on the Gardner-Holdt scale, wherein the combined weight of the monomers varies between 25% and 60% of the total combined weight of alkyd and monomers; wherein the weight ratio of monomeric styrene to monomeric acrylonitrile is within the range of 9:1 and 1:1 and wherein the $\alpha,\beta$-unsaturated monocarboxylic acid is present in an amount varying between 2% and 30% of the total weight of the alkyd resin.

10. A process for preparing modified alkyd resins which comprises heating (1) a polycarboxylic acid consisting essentially of a polycarboxylic acid selected from the group consisting of phthalic acid and a saturated aliphatic polycarboxylic acid, (2) a polyhydric alcohol, (3) a monocarboxylic acid selected from the group consisting of the acids of natural drying oils and semi-drying oils and (4) an $\alpha,\beta$-unsaturated monocarboxylic acid having the general formula R—CH=CHCOOH wherein R is a member selected from the group consisting of an alkyl radical having 1–3 carbon atoms, a furyl radical and a phenyl radical in a mutually inert solvent, until an acid number of less than 30 is reached, thereafter adding monomeric styrene and a compound selected from the group consisting of monomeric acrylonitrile, monomeric methacrylonitrile and monomeric ethacrylonitrile and heat reacting the mixture in the presence of a catalyst until a 50–60% solids solution of the modified resin in xylol has a viscosity of F–$Z_5$ on the Gardner-Holdt scale, wherein the combined weight of the monomers varies between 25% and 60% of the total combined weight of the alkyd and monomers; wherein the weight ratio of monomeric styrene to monomeric acrylonitrile is within the range of 9:1 and 1:1 and wherein the $\alpha,\beta$-unsaturated monocarboxylic acid is present in an amount varying between 2% and 30% of the total weight of the alkyd resin.

11. A process for preparing modified alkyd resins which comprises heating (1) a polycarboxylic acid consisting essentially of a polycarboxylic acid selected from the group consisting of phthalic acid and the saturated aliphatic polycarboxylic acids, (2) a polyhydric alcohol, (3) a monocarboxylic acid selected from the group consisting of the acids of natural drying oils and semi-drying oils and (4) an $\alpha,\beta$-unsaturated monocarboxylic acid, having the general formula R—CH=CHCOOH wherein R is a member of the group consisting of an alkyl radical having 1–3 carbon atoms, a furyl radical and a phenyl radical, until an acid number of less than 30 is reached, thereafter adding monomeric styrene and a compound selected from the group consisting of monomeric acrylonitrile, monomeric methacrylonitrile and monomeric ethacrylonitrile and heat reacting the mixture in the presence of a catalyst and a mutually inert solvent until a 50–60% solids solution of the modified alkyd resin in xylol has a viscosity of L–$Z_2$ on the Gardner-Holdt scale, wherein the combined weight of the monomers varies between 5% and 60% of the total combined weight of alkyd and monomers; wherein the weight ratio of monomeric styrene to the monomeric acrylonitrile is within the range of 9:1 and 1:1 and wherein the $\alpha,\beta$-unsaturated monocarboxylic acid is present in an amount varying between 2% and 30% of the total weight of the alkyd resin.

JOHN H. DANIEL, Jr.
JOHN C. PETROPOULOS.

REFERENCES CITED

The following references are of record in the file of this patent:

UNITED STATES PATENTS

| Number | Name | Date |
| --- | --- | --- |
| 2,305,224 | Patterson | Dec. 15, 1942 |
| 2,470,752 | Bobalek | May 24, 1949 |

FOREIGN PATENTS

| Number | Country | Date |
| --- | --- | --- |
| 540,169 | Great Britain | Oct. 8, 1941 |